United States Patent
Daniel et al.

(10) Patent No.: US 6,954,328 B2
(45) Date of Patent: Oct. 11, 2005

(54) MULTI-LAYER HOUSING STRUCTURE WITH TUNED LAYERS USING HYPOTHETICAL MODELING

(75) Inventors: Mathew Daniel, Oklahoma City, OK (US); Svetlana I. Kovinskaya, Edmond, OK (US)

(73) Assignee: Seagate Technology, LLC, Scotts Valley, CA (US)

( * ) Notice: Subject to any disclaimer, the term of this patent is extended or adjusted under 35 U.S.C. 154(b) by 674 days.

(21) Appl. No.: 09/898,808

(22) Filed: Jul. 2, 2001

(65) Prior Publication Data

US 2002/0141108 A1 Oct. 3, 2002

Related U.S. Application Data

(60) Provisional application No. 60/267,800, filed on Feb. 9, 2001.

(51) Int. Cl.[7] .......................... G11B 17/02; G11B 17/00
(52) U.S. Cl. .................................................. 360/97.01
(58) Field of Search ........................ 360/97.01, 97.02, 360/973.03, 98.01; 29/603.03; 188/378; 384/99; 123/192.1; 703/1; 73/579, 3

(56) References Cited

U.S. PATENT DOCUMENTS

| | | | |
|---|---|---|---|
| 4,418,573 A | * | 12/1983 | Madigosky et al. .......... 73/574 |
| 4,491,888 A | | 1/1985 | Brown et al. |
| 4,562,499 A | | 12/1985 | Mizoshita |
| 4,780,777 A | | 10/1988 | Biermeier et al. |
| 5,021,905 A | | 6/1991 | Sleger |
| 5,025,336 A | | 6/1991 | Morehouse et al. |
| 5,148,006 A | * | 9/1992 | Driscoll .................... 235/70 R |
| 5,214,549 A | | 5/1993 | Baker et al. |
| 5,227,982 A | * | 7/1993 | Kipple et al. ................. 702/56 |
| 5,235,482 A | * | 8/1993 | Schmitz ................... 360/97.02 |
| 5,282,100 A | | 1/1994 | Tacklind et al. |
| 5,483,397 A | | 1/1996 | Gifford et al. |
| 5,510,954 A | | 4/1996 | Wyler |
| 5,520,052 A | * | 5/1996 | Pechersky ..................... 73/579 |
| 5,587,855 A | | 12/1996 | Kim |
| 5,691,037 A | * | 11/1997 | McCutcheon et al. ....... 428/172 |
| 5,761,184 A | * | 6/1998 | Dauber et al. ............... 369/247 |
| 5,770,133 A | | 6/1998 | Boutaghou |
| 5,781,373 A | | 7/1998 | Larson et al. |
| 5,875,067 A | | 2/1999 | Morris et al. |
| 5,877,915 A | * | 3/1999 | Ishida ..................... 360/97.03 |
| 5,982,580 A | | 11/1999 | Woldemar et al. |
| 6,090,147 A | * | 7/2000 | Bremner et al. ................ 703/1 |
| 6,177,173 B1 | | 1/2001 | Nelson |
| 6,191,510 B1 | * | 2/2001 | Landin et al. ................. 310/51 |
| 6,251,493 B1 | * | 6/2001 | Johnson et al. ............... 428/71 |
| 6,288,866 B1 | * | 9/2001 | Butler et al. .............. 360/97.01 |
| 6,301,967 B1 | * | 10/2001 | Donskoy et al. .............. 73/579 |
| 6,529,345 B1 | * | 3/2003 | Butler et al. ............. 360/97.01 |
| 6,536,555 B1 | * | 3/2003 | Kelsic et al. ................ 181/207 |
| 2001/0044023 A1 | * | 11/2001 | Johnson et al. ............. 428/354 |

OTHER PUBLICATIONS

Ing L. Cremer and M. Heckl; *Structure–Borne Sound–Structural Vibrations and Sound Radiation at Audio Frequencies*; 1973, 1988; pp. 195–199, 232, 243–261; Chapter III Damping; Springer–Verlad; Germany.

* cited by examiner

*Primary Examiner*—George J. Letscher
*Assistant Examiner*—Christopher R. Magee
(74) *Attorney, Agent, or Firm*—Fellers, Snider, et al.

(57) ABSTRACT

Apparatus and method for reducing generation of acoustic noise in a disc drive. A multi-layer disc drive housing structure includes a housing layer, a plurality of rigid damping layers and a corresponding plurality of interposed viscoelastic damping layers. Characteristics of the various layers are selected by evaluating hypothetical models each having first, second and third theoretical layers, at least one of which is a composite layer made up of multiple layers. Loss factor profiles are evaluated in relation to housing layer resonant frequency to provide an optimum multi-layer structure.

16 Claims, 5 Drawing Sheets

MULTI-LAYER HOUSING STRUCTURE WITH TUNED LAYERS USING HYPOTHETICAL MODELING

RELATED APPLICATIONS

This application claims priority to Provisional Application No. 60/267,800 filed Feb. 9, 2001.

FIELD THE INVENTION

The claimed invention relates generally to the field of disc drive data handling devices, and more particularly, but not by way of limitation, to an improved housing structure for a disc drive having multiple rigid damping layers and visco-elastic layers all having nominally the same footprint and affixed as a laminate to a top cover of the disc drive housing to reduce the generation of acoustic noise.

BACKGROUND

Disc drives are data handling systems used to magnetically store and retrieve digital data files. A typical disc drive comprises a sealed housing which encloses one or more rotatable discs to which data are magnetically stored by a corresponding array of read/write transducing heads. The heads are supported by a rotatable actuator and moved to various tracks defined on the disc surfaces by an actuator motor. The discs are supported and rotated by a spindle motor at a constant high speed.

A typical disc drive housing comprises a rigid base deck having a substantially planar support area to support the various mechanical subassemblies of the drive. A top cover mates with side walls extending vertically around the perimeter of the support area to complete the enclosure. A typical housing configuration uses a relatively thick cast aluminum base deck and a relatively thin stainless steel stamped top cover.

Current disc drive designs are typically configured to accommodate a "top-down" assembly methodology in which automated assembly lines use robotic arms to sequentially assemble the various subassemblies onto each base deck. Once all of the subassemblies have been installed, a top cover is mated with and secured to the base deck using a number of external fasteners. Typically, fasteners are additionally inserted through the top cover into top portions of the spindle motor and actuator assembly.

While affixing the spindle motor and actuator assembly to both the top cover and the base deck improves the mechanical support of these subassemblies, such configuration also enhances the excitation of the housing during operation of the disc drive, undesirably resulting in the generation of acoustic noise.

The level of sound radiation from a disc drive housing through excitation of the housing is generally determined by sound energy produced by the rotating discs, and vibration energy produced by the rotating discs and by movement of the actuator assembly during access (seek) operations as the heads are quickly moved to different tracks on the disc surfaces. Generally, thicker housing structures attenuate excitation energy better than thin structures. Since the top cover is usually thinner than the base deck, the cover will tend to transmit more acoustic energy than the base deck.

In an effort to reduce the generation of acoustic noise, disc drive manufacturers have attempted to dampen the housing structure to increase attenuation (transmission loss). For example, U.S. Pat. No. 5,875,067 issued to Morris et al. discloses providing a small, circumferentially extending acoustic compliance area as a thinned area immediately surrounding a contact point to which an excitation source (spindle motor, actuator assembly) is attached. This compliance area is selected to "decouple" the excitation source from remaining portions of the housing so that excitation energy is not passed to the remaining portions of the housing. U.S. Pat. No. 5,214,549 issued to Baker et al. discloses a constrained layer damping structure formed by placing a visco-elastic layer of material on a portion of a housing surface and then placing a thin, rigid layer of material on the visco-elastic layer. This allows shear forces in the visco-elastic layer to dissipate excitation of the housing structure.

While operable, there remains a continued need for improvements in the art to reduce disc drive housing excitation to accommodate ever higher levels of disc drive performance. It is to such improvements that the present invention is directed.

SUMMARY OF THE INVENTION

In accordance with preferred embodiments, a multi-layer disc drive housing structure is provided to enclose and support an excitation source. The housing structure is configured to reduce generation of acoustic noise during disc drive operation.

The housing structure preferably includes a substantially planar housing layer, a plurality of rigid damping layers and a corresponding plurality of visco-elastic damping layers arranged in a laminate stack. The rigid damping layers are preferably formed from thin sheets of stainless steel and the visco-elastic damping layers are preferably formed from thin sheets of pressure sensitive adhesive (PSA).

The visco-elastic damping layers and the rigid damping layers share a common areal footprint over the housing member surface. The housing layer, visco-elastic damping layers and rigid damping layers are selected to attenuate excitation energy transmitted to the planar housing member by the excitation source.

The characteristics of the various damping layers are preferably selected by determining a resonant frequency of a housing layer of a disc drive. A plurality of hypothetical models are developed for the housing structure each comprising first, second and third theoretical layers wherein at least one of said theoretical layers comprises multiple damping layers. A loss factor profile is determined for each of the hypothetical models in the frequency domain and, consequently, in relation to the resonant frequency of the housing layer. The final structure configuration is thereafter selected in relation to the loss factor profiles of the various hypothetical models.

These and various other features and advantages which characterize the present invention will be apparent from a reading of the following detailed description and a review of the associated drawings.

BRIEF DESCRIPTION OF THE DRAWINGS

FIG. 6 provides a flow chart for a HOUSING STRUCTURE CONFIGURATION routine illustrative of steps carried out in accordance with preferred embodiments to select a housing structure configuration for the disc drive.

DETAILED DESCRIPTION

Figure 1:
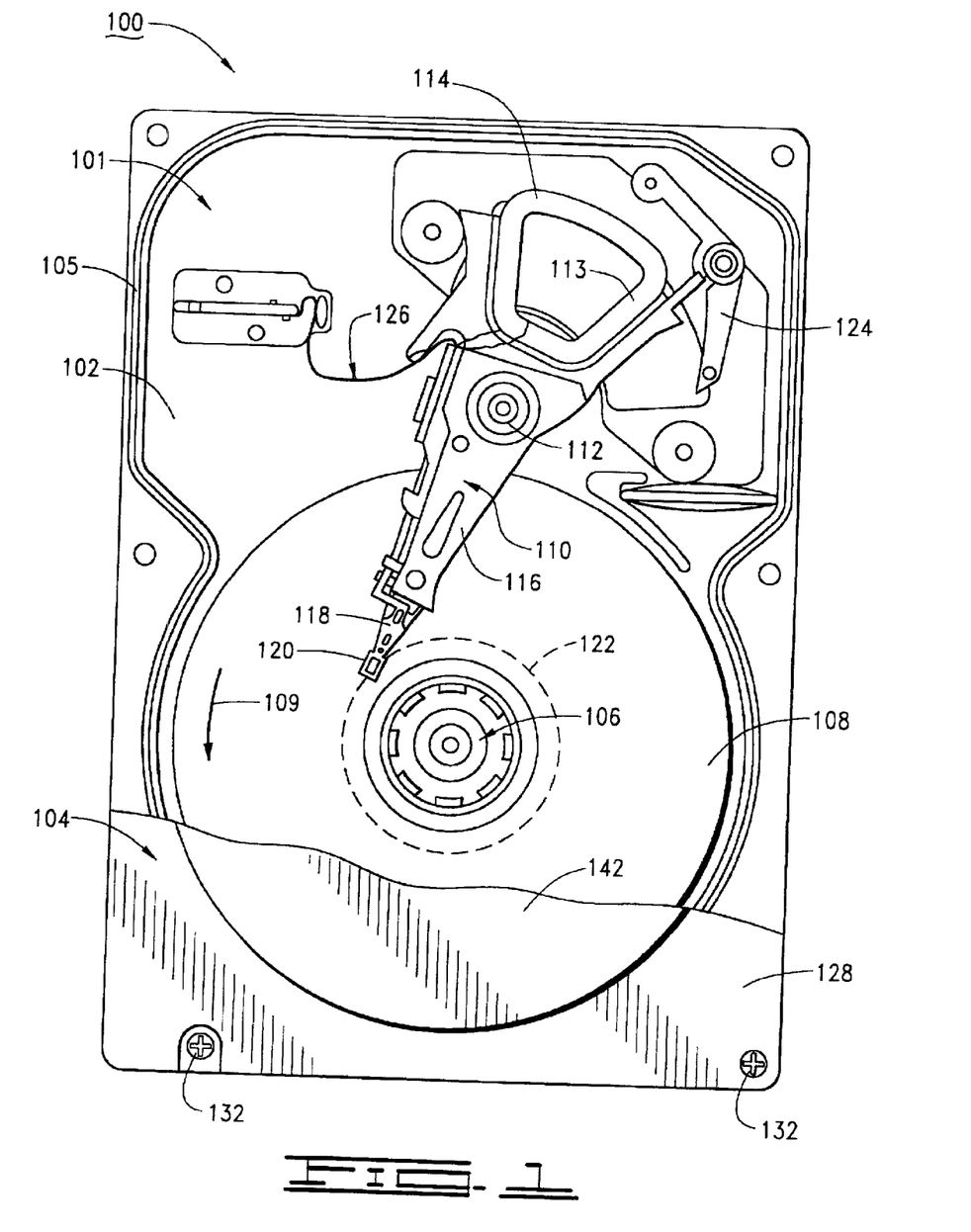
FIG. 1 is a top plan view of a disc drive constructed in accordance with preferred embodiments of the present invention, the disc drive having a head-disc assembly (HDA) to which a printed circuit board assembly (PCBA, not shown), is attached.

Referring to the drawings in general, and more particularly to FIG. 1, shown therein is a top plan view of a disc drive data handling system 100 (hereinafter "disc drive") constructed in accordance with preferred embodiments of the present invention. The disc drive 100 includes a head-disc assembly (HDA) 101 which houses various mechanical components of the disc drive 100, and a disc drive printed circuit board assembly (PCBA) which supports various electronic communication and control circuits. The PCBA is affixed to the underside of the HDA 101 and is therefore not visible in FIG. 1.

The HDA 101 includes a base deck 102 which provides primary mechanical support for various internal components of the drive. The base deck 102 cooperates with a top cover assembly 104 (shown in partial cut-away) and a gasket 105 to form a sealed housing structure for the disc drive 100.

A spindle motor 106 is supported within the housing to rotate a number of recording discs 108 in an angular direction indicated at 109. An actuator 110 is provided adjacent the discs 108 and rotates about a cartridge bearing assembly 112 in response to the application of current to an actuator coil 113 of a voice coil motor (VCM) 114. The actuator 110 includes a number of rigid actuator arms 116 which support flexible suspension assemblies (flexures) 118. The flexures, in turn, support a corresponding number of read/write heads 120 adjacent the respective disc recording surfaces. When the disc drive is deactivated, the heads 120 are brought to rest upon texturized landing zones 122 and the actuator 110 is secured using a latch 124. A flex circuit assembly 126 provides communication paths between the actuator 110 and the disc drive PCBA.

Figure 2:
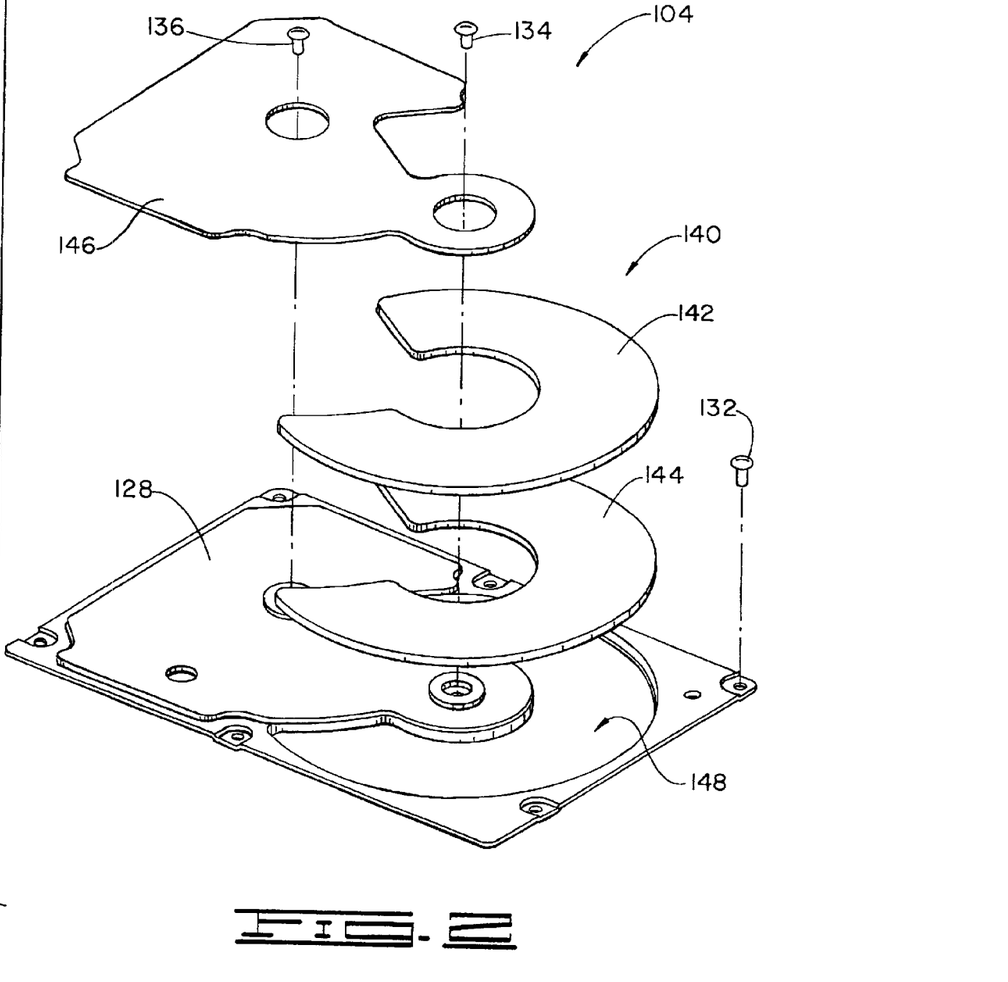
FIG. 2 is an exploded, isometric view of the top cover of the disc drive of FIG. 1 showing the use of multiple damping layers in accordance with preferred embodiments.

FIG. 2 provides an exploded, isometric view of the top cover assembly 104 of FIG. 1. The top cover assembly 104 includes a generally planar top cover member 128 which is attached to the base deck 102 (FIG. 1) using a number of fasteners (one such fastener is shown at 132 in FIG. 2). To better illustrate the respective orientations of FIGS. 1 and 2, it will be noted that fastener 134 is used to secure the top cover member 128 to the spindle motor 106, and fastener 136 secures the top cover member 128 to a central shaft of the cartridge bearing assembly 112. The top cover member 128 is preferably formed from stamped stainless steel.

Adhered to the top cover member 128 is a damping structure 140 which is selectively configured to provide desired attenuation characteristics to the housing structure. The damping structure 140 is made up of multiple rigid damping layers 142, 144 and 146 and visco-elastic damping layers (not separately shown) interposed therebetween to form a laminate with the top cover member 128. The rigid damping layers 142, 144 and 146 are preferably formed from stamped stainless steel or aluminum, and the visco-elastic damping layers each preferably comprise a thin layer of double sided pressure sensitive adhesive (PSA), with or without a central flexible web layer embedded within the adhesive.

The rigid damping layers 142, 144 share a nominally common footprint; that is, the layers 142, 144 each have a common shape, coverage area and alignment on the top cover member 128. The layers 142, 144 are preferably configured to nest within a correspondingly shaped recess 148 in the top cover member 128 about the spindle motor 106.

As will be recognized, disc drives are usually required to maintain overall external dimensions that meet a specified volumetric (form factor) requirement. The recess 148 can thus be used to accommodate the additional thickness added to the drive by the layers 142, 144, so long as internal mechanical clearance is available to accommodate the recess. Of course, the particular use of the recess 148, the particular location of the layers 142, 144 shown in FIG. 2, and the attachment of the layers to the external surface of the top cover member (as opposed to the internal surface of the top cover member) are all merely illustrative and not necessarily limiting to the scope of the present invention.

Continuing with FIG. 2, the separate rigid damping layer 146 and associated visco-elastic layer are placed adjacent a substantial part of the remaining portion of the top cover member 128 to surround the spindle motor 106 and actuator 110. This separate layer 146 is provided merely for purposes of disclosing a preferred embodiment and is not necessarily germane to the invention as claimed below. The configuration of the rigid damping layers 142, 144 and associated visco-elastic damping layers is of particular interest to the present discussion. As mentioned above, it is highly desirable to dampen the housing structure to increase the attenuation of excitation energy transmitted to the top cover member 128. Application of a single layer of visco-elastic damping layer and a single rigid damping layer to the top cover, as disclosed by the Baker U.S. Pat. No. 5,214,549 reference, has been found to be highly advantageous in this regard.

The present invention is an improvement over the three-layer approach disclosed by the Baker U.S. Pat. No. 5,214,549 reference and involves replacing a single thicker rigid damping layer with a number of thinner rigid layers, each with its own visco-elastic damping layer. This has been found to provide significant improvements in damping characteristics as compared to a single rigid damping layer, even when the multiple layers have a collective thickness that is the same as, or even less than, the thickness of the single thicker layer. Moreover, in certain circumstances, varying the individual thicknesses and the ordering of the layers in the laminate stack has also been found to provide improvements over a single thicker layer. Exemplary embodiments are shown in FIGS. 3–5.

Figure 3:
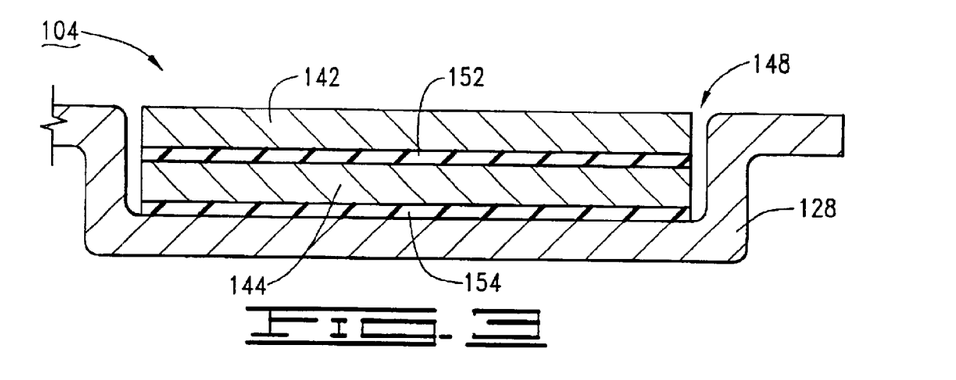
FIG. 3 is a cross-sectional, elevational view of the top cover in accordance with a preferred embodiment.

FIG. 3 provides an elevational, cross-sectional view of a portion of the top cover assembly 104 having five total layers comprising the top cover layer 128, the two rigid damping layers 142, 144 and two visco-elastic layers 152, 154. The rigid damping layers 142, 144 are shown to each share the same nominal thickness. It will be understood that the aspect ratio and relative thicknesses of the various layers of FIG. 3 have been exaggerated somewhat to better illustrate the various layers.

Figure 4:
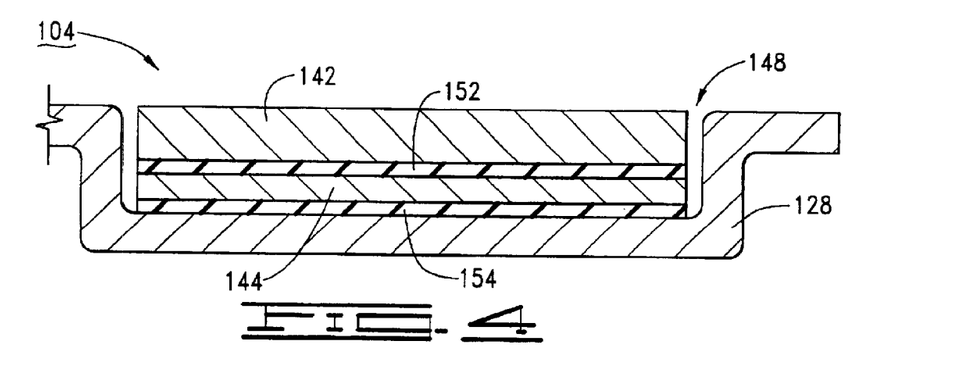
FIG. 4 is a cross-sectional, elevational view of the top cover in accordance with an alternative preferred embodiment.

FIG. 4 provides another five-layer arrangement. In this embodiment, the rigid damping layer 142 has a greater thickness than that of the rigid damping layer 144.

Figure 5:
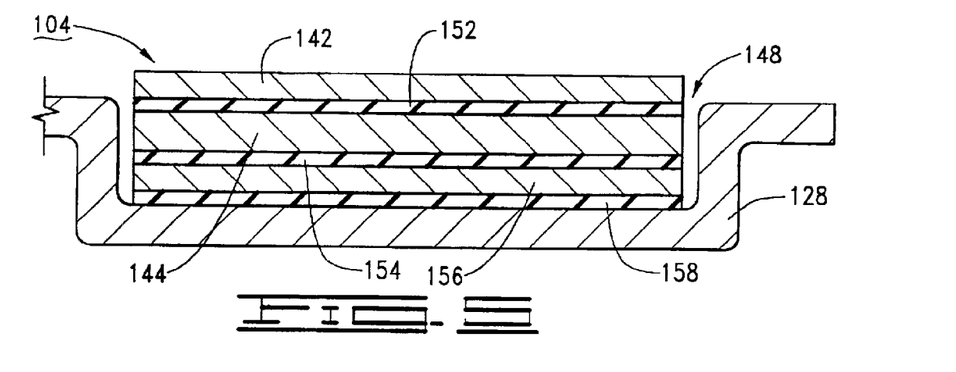
FIG. 5 is a cross-sectional, elevational view of the top cover in accordance with another alternative preferred embodiment.

FIG. 5 provides a seven-layer arrangement formed from the top cover layer 128, three rigid damping layers 142, 144 and 156, and three visco-elastic layers 152, 154, 158. Rigid layers 142 and 156 share substantially the same thickness, and this thickness is less than the thickness of intermediate rigid layer 144.

From these exemplary embodiments it will be seen that any number of multiple rigid damping layers with the same footprint and with the same or different thicknesses can be utilized to obtain optimum acoustic damping, depending upon the requirements of a given application. The selection of a particular configuration involves a tradeoff among various considerations. Generally, a thicker structure will provide higher overall transmission loss (higher attenuation). However, transmission loss is frequency dependent. Simply selecting the thickest possible structure allowable by the form factor constraints may not provide optimum results since the structure resonates at frequencies excited by excitation sources within the HDA. Experiments have shown that taking an existing multi-layer structure and adding additional rigid and visco-elastic layers can actually degrade the damping characteristics of the housing; a five-layer structure does not inherently provide better performance over a three-layer structure, nor a seven-layer structure over a five-layer in view of the constraints of a given application.

An empirical, trial-and-error approach could be used in an attempt to find a particular number and combination of damping layers that provides desired results. This would involve the physical construction of numerous housing structures having various numbers and thicknesses of layers from various materials and testing each one using suitable test equipment, such as an anachoic chamber. Such approach is time and resource intensive, however, and therefore may not be practical or desirable in a high volume disc drive manufacturing environment where the available design time cycle is relatively short.

Thus, FIG. 6 provides a flow chart for a HOUSING STRUCTURE CONFIGURATION routine 200 which is advantageously used to select an optimum multi-layer damping structure configuration. The routine considers a multi-layer structure as a theoretical three-layer structure, with one of the three layers comprising a composite of multiple layers. Optimal characteristics for each of the multiple layers are identified using computer modeling.

At step 201, the configuration of the particular HDA 101 to be optimized is first identified. It is contemplated that step 201 will preferably include provision of a statistically significant number of sample HDAs having the designated configuration. The sample HDAs selected during step 201 will have an initial thickness for the top cover 128 and will have no additional damping layers applied thereto.

At step 202, an analysis is performed to determine the overall thickness of the housing structure to achieve maximum attenuation (transmission loss, TL). As will be recognized, TL is proportional to thickness of the housing structure, and this relationship can be expressed as follows:

$$TL = TL(\omega_t, H) = 10 \log\{1 + [\omega_t H \gamma / 2C]^2\} \quad (1)$$

where TL=transmission loss $\omega_t$=frequency of transmitted sound

C=sound velocity in air $\gamma$=ratio of density of cover material to density of air H=cover thickness=$t_1+t_2+\ldots+t_n$ where t=thickness of each layer of rigid damping or visco-elastic material n=number of layers For a particular chosen cover thickness, equation (1) becomes $$TL = TL(\omega_t) \quad (2)$$

Form factor and internal clearance requirements will provide an upper limit on the maximum available thickness; nevertheless, equations (1) and (2) can be advantageously used to identify an overall thickness of the damping structure consonant with form factor and clearance constraints. Using the top cover assembly 104 of FIG. 3 by way of example, the overall thickness H will comprise the thickness of the top cover member 128, rigid damping layers 142, 144 and associated visco-elastic layers 152, 154.

Preferably, step 202 involves specifying the properties and dimensions H and $\gamma$ for a particular multi-layer cover. It is assumed that C, the speed of sound in air, is constant. From equation (1) it can be seen that as the value of H increases, the transmission loss TL also increases at any particular frequency. Thus, one should generally select the maximum overall thickness H that the form factor allows.

After choosing the value of H, there remains the selection of the number, thicknesses and material composition of the various layers, taking into consideration the sound emitting properties of the housing structure at the resonant frequencies of the housing structure. At the first of the resonant frequencies, the amplitude of vibration of the housing structure becomes very large. To reduce acoustic noise generated by the housing structure, inherent damping of the housing structure at such resonant frequencies should be increased.

Continuing with FIG. 6, at step 203 the resonant frequencies of the housing layer (in this case top cover 128) are determined without the presence of additional damping layers. This is because there will generally only be a small shift in the first resonant frequency of the housing layer 128 as a result of the application of the relatively thin damping layers to the housing layer 128. These additional layers can be characterized as a "filter structure" which attenuates those frequencies of interest that are efficiently transmitted through the housing layer 128. The HDAs selected during step 201 are tested using suitable test equipment (such as an anachoic chamber) to identify the resonant frequencies of the housing layer 128.

At step 204, a number of different hypothetical models of the housing structure are selected each having three theoretical layers, with at least one of the theoretical layers comprising a multi-layer composite. By way of illustration, with reference to the configuration of FIG. 3 one such hypothetical model can use the top cover layer 128 as the first theoretical layer, the immediately adjacent visco-elastic layer 154 as the second theoretical layer, and the remaining rigid damping layers 142, 144 and the visco-elastic layer 152 as the third theoretical layer. Other groupings of the layers can be made as desired. Table 1 provides possible groupings of the layers for the five-layer configuration of FIG. 3, and Table 2 provides possible groupings of the layers for the seven-layer configuration of FIG. 5.

TABLE 1

| Model | Theoretical Layers | Actual Layers. |
|---|---|---|
| I | $h_1$ | 128 |
|  | $h_2$ | 154 |
|  | $h_3$ | 144, 152, 142 |
| II | $h_1$ | 128, 154, 144 |
|  | $h_2$ | 152 |
|  | $h_3$ | 142 |

TABLE 2

| Model | Theoretical Layers | Actual Layers. |
|---|---|---|
| I | $h_1$ | 128 |
|  | $h_2$ | 158 |
|  | $h_3$ | 156, 154, 144, 152, 142 |
| II | $h_1$ | 128, 158, 156 |
|  | $h_2$ | 154 |
|  | $h_3$ | 144, 152, 142 |
| III | $h_1$ | 128, 158, 156, 154, 144 |
|  | $h_2$ | 152 |
|  | $h_3$ | 142 |

At step 205, a loss factor is determined for each of the different hypothetical models. The loss factor is a measure of the damping for the housing structure and can be determined using the following relationship for a three-layer structure having two rigid damping layers separated by a layer of adhesive:

$$\eta = 2\eta_a g \delta / [1 + 2g(2+\delta) + 4g^2(1+\delta)] \quad (3)$$

where $\eta = \eta(\omega)$ = loss factor $\omega$ = frequency of vibration of the housing structure $\eta = \eta_a(\omega)$ = loss factor for the particular adhesive (layer 2)

$\delta = \delta(\omega) = G_2 / [E_3 h_3 h_2 k^2]$ where $G_2$ = shear modulus of the material of layer 2, which is generally a function of frequency and temperature for an adhesive; it is assumed for this model that temperature is constant $E_i$ = Young's modulus for the $i^{th}$ layer $h_i$ = thickness of the $i^{th}$ layer $k^2 = \omega (m_i / D_i)^{1/2}$ $m_i = \rho_i h_i$ for the $i^{th}$ layer $D_i = E_i h_i^3 / [12(1-\nu_i)]$ $\nu_i$ = Poisson's ratio for the $i^{th}$ layer=0.3 for steel $g = g(\omega)$ = shear parameter = $12\alpha_{31}^2 \alpha_3 \beta_3 / [1+\alpha_3^2 \beta_3]$ where $\alpha_{31} = h_{31} / h_1$ $h_{31} = [(h_1+h_3)/2] + h_2$ $\alpha_3 = h_2 / h_1$ $\beta_3 = E_3 / E_1$ All of the above relations are either known functions of frequency or known constants for particular hypothetical models of the housing structure. A loss factor plot as a function of frequency can thus be readily determined for each model. For example, using the proposed hypothetical model mentioned above for FIG. 3, it will be noted that the characteristics of the first theoretical layer (top cover 128) are known based on the initial configuration. That is, the material, thickness ($h_1$), Young's modulus, Poisson's ratio, etc. are known based on the sample HDAs selected during step 201. Likewise, the characteristics of the second theoretical layer (visco-elastic layer 154) are also known based on an initial selection of a suitable configuration of this material (such as a commercially available PSA layer of selected thickness $h_2$).

Since the overall thickness H of the entire structure was determined during step 202, the thickness of the third theoretical layer ($h_3$) becomes $h_3 = H - (h_1 + h_2)$. For purposes of this analysis, the third theoretical layer can be assumed to have the properties of a single, solid layer (such as steel), and the properties needed for equation (3) can therefore be readily determined based on this assumption.

The operation of step 205 involves calculating a loss factor profile for each hypothetical model in turn over the frequencies of interest identified during step 203. Different hypothetical models can use different thicknesses, materials and combinations for the first, second and third hypothetical layers. While varying the thickness of the first theoretical layer may result in a small shift in the resonant frequencies of the first layer, as mentioned above such shifts will be minor as long as significant changes are not made in the thickness or the material composition of the first layer. Thus, the frequencies of interest identified during step 203 will remain valid criteria for the analysis.

Once loss factor values have been calculated for each of the hypothetical models, the routine continues to step 206 where an optimal hypothetical model is identified. Generally, the optimal hypothetical model will be the model that provides the largest loss factor at the frequencies of interest. At this point, using the example above the characteristics of the top cover layer 128 and the visco-elastic layer 154 will be fully known. What will still be unknown is the particular configuration of the various layers making up the third theoretical layer. However, the overall thickness and the material of the rigid layers of the third theoretical layer will be known at this point.

The routine continues to step 207 to determine the optimal configuration of the various layers in the third theoretical layer. While empirical techniques can be employed at this point to evaluate various combinations based on the boundary conditions determined above, preferably the analysis of equation (3) is once again applied to this layer. That is, the third theoretical layer is now considered to be a new theoretical three-layer structure and the process is repeated. To simplify the model of the new structure, it is assumed that the thickness of this new theoretical three-layer structure is the same as the thickness of the previously determined third theoretical layer. This assumption is sufficient to take into account the effects of the first structure on the bending of the adjoined rigid layer of the new structure. Various alternative hypothetical models are constructed for this new set of layers, loss factor profiles are calculated at the frequencies of interest for each model, and the optimum configuration is selected that provides the best results. It will be noted that a five-layer structure results from two passes through the evaluation of equation (3). A third pass through the evaluation will result in a seven-layer structure (such as shown in FIG. 5), and so on.

It is contemplated that various combinations of multi-layer structures can be evaluated until one (or more) final configurations are selected. Physical models can then be constructed and evaluated to select the final configuration, step 208, after which the routine ends, step 209.

Figure 7:
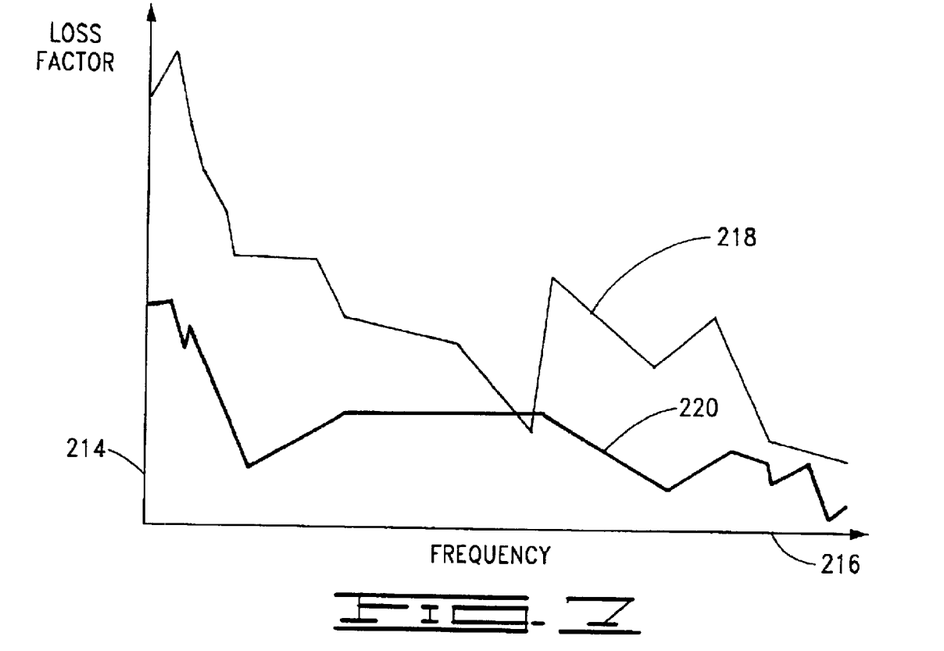
FIG. 7 is a graphical representation of damping response characteristics to illustrate improvements achieved by a top cover configured in accordance with the routine of FIG. 6 as compared to a prior art top cover.
Figure 8:
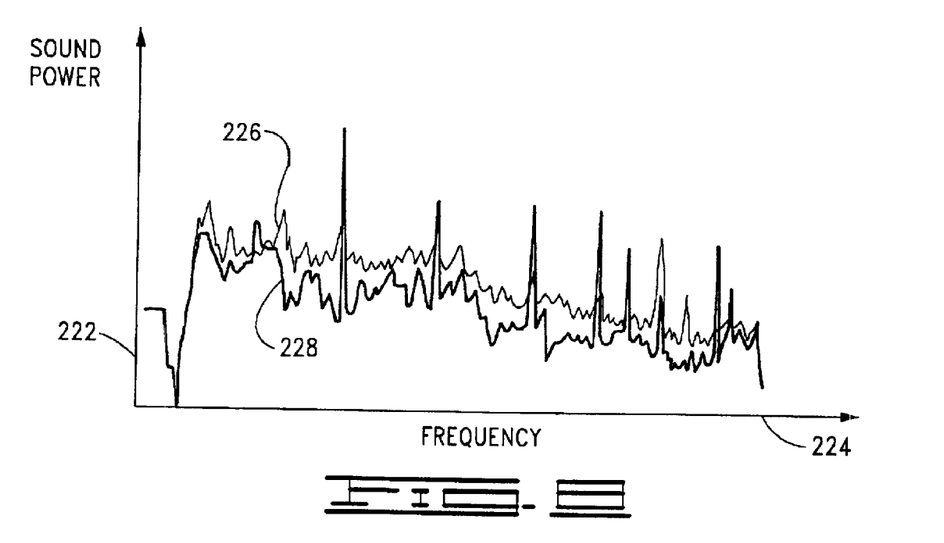
FIG. 8 is a graphical representation of sound power versus frequency for the drive configurations of FIG. 7.

FIGS. 7 and 8 graphically illustrate the significant improvements of the multi-layer damping structure 140 of the present invention as compared to the prior art. FIG. 7 provides a graphical representation of acoustical efficiency in terms of loss factor (y-axis 214) versus frequency (x-axis 216).

Curve 218 represents the loss factor for a conventional three-layer housing structure having a single rigid damping layer and visco-elastic damping layer. Curve 220 represents the loss factor for a five-layer housing structure having the configuration of FIG. 3 (i.e., two rigid damping layers of the same thickness and two visco-elastic damping layers). From FIG. 7 it can be readily concluded that the housing structure configured in accordance with FIG. 3 provides markedly improved performance over the conventional structure.

FIG. 8 compares sound power emissions achieved by the housing structures of FIG. 7. Particularly, FIG. 8 is a graphical representation of sound power (y-axis 222) versus frequency (x-axis 224). Curve 226 represents the sound power emissions by the drive having the conventional housing structure, and curve 228 represents the sound power emissions by the drive having the structure of FIG. 3.

At the frequency band of interest (0–12,800 Hz), the acoustical efficiency of the cover constructed in accordance with the present invention is higher by typically 5–7 dB. Average sound power is lower by typically 2 dB.

Disc drives were configured using the methodology presented above having 1 and 2 discs, respectively. Sound powers were measured for these drives at 2.8 dB and 3.2 dB while the drives were operated in an idle mode (with a disc speed of about 10,000 revolutions per minute). These results were found to be better than all other available commercial drives in these respective classes.

It will now be understood that the present invention is generally directed to an apparatus and method for reducing generation of acoustic noise in a disc drive. In accordance with preferred embodiments, a multi-layer disc drive housing structure (such as 140) encloses and supports an excitation source (such as 106, 110), and includes a substantially planar housing layer (such as 128); a first visco-elastic damping layer (such as 154, FIG. 3; 158, FIG. 5) contactingly affixed to a portion of the housing layer; a first rigid damping layer (such as 144, FIG. 3; 156, FIG. 5) contactingly affixed to the first visco-elastic damping layer; a second visco-elastic damping layer (such as 152, FIG. 3; 154, FIG. 5) contactingly affixed to the first rigid damping layer; and a second rigid damping layer (such as 142, FIG. 3; 144, FIG. 5) contactingly affixed to the second visco-elastic damping layer.

The first and second visco-elastic damping layers and the first and second rigid damping layers share a common areal footprint over the housing member surface, and the housing layer, the first and second visco-elastic damping layers and the first and second rigid damping layers have respective thicknesses selected to attenuate excitation energy transmitted to the planar housing member by the excitation source.

In accordance with additional preferred embodiments, the characteristics of the various damping layers are selected in accordance with a method comprising steps of (a) determining a resonant frequency of a housing layer of a disc drive (such as step 203, FIG. 6); (b) developing a plurality of hypothetical models for the housing structure each comprising first, second and third theoretical layers wherein at least one of said theoretical layers comprises multiple damping layers (such as step 204, FIG. 6); (c) determining a loss factor profile for each said hypothetical model in relation to the resonant frequency (such as step 205, FIG. 6); and (d) selecting a final characteristic of each of said rigid damping layers and said visco-elastic damping layers in relation to the loss factor profiles (such as step 207, FIG. 6).

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method comprising:

determining a resonant frequency of a housing layer of a housing member, the housing layer adapted to support a plurality of rigid damping layers interposed with a plurality of visco-elastic damping layers;

ascertaining a loss factor profile in relation to the resonant frequency for each of a plurality of hypothetical models for the housing structure, each model comprising first, second and third theoretical layers wherein at least one of said theoretical layers comprises multiple damping layers; and selecting a final characteristic of each of said rigid damping layers and said visco-elastic damping layers in relation to the ascertained loss factor.

2. The method of claim 1, the final characteristic selected during the selecting step comprises a respective thickness for each of the rigid damping layers.

3. The method of claim 2, wherein the final characteristic selected during the selecting step further comprises a respective thickness for the housing layer.

4. The method of claim 1, wherein the housing structure comprises five layers comprising the housing layer, a first visco-elastic damping layer affixed to the housing layer, a first rigid damping layer affixed to the first visco-elastic damping layer, a second visco-elastic damping layer affixed to the first rigid damping layer, and a second rigid damping layer affixed to the second visco-elastic damping layer.

5. The method of claim 4, wherein at least one of said hypothetical models identifies the housing layer as the first theoretical layer, the first visco-elastic damping layer as the second theoretical layer, and the second visco-elastic damping layer and the first and second rigid damping layers as the third theoretical layer.

6. The method of claim 1, wherein each one of said theoretical layers comprising multiple layers is characterized as a composite layer, and wherein the selecting step comprises steps of:

identifying an optimum hypothetical model from the plurality of hypothetical models;

developing a second plurality of hypothetical models for each composite layer of the optimum hypothetical model identified during the identifying step, each of said second plurality of hypothetical models in turn comprising first, second and third theoretical layers;

determining a loss factor profile for each of said second plurality of hypothetical models in relation to tile resonant frequency; and further selecting a final characteristic of each of said rigid damping layers and said visco-elastic damping layers in relation to the loss factor profiles from the determining step.

7. A disc drive having a multi-layer housing structure selected in accordance with the method of claim 1.

8. A multi-layer housing structure comprising a substantially planar housing layer;

a first visco-elastic damping layer contactingly affixed to a portion of the housing layer;

a first rigid damping layer contactingly affixed to the first visco-elastic damping layer;

a second visco-elastic damping layer contactingly affixed to the first rigid damping layer; and a second rigid damping layer contactingly affixed to the second visco-elastic damping layer, wherein the first and second visco-elastic damping layers and the first and second rigid damping layers form a multi-layer damping structure and share a common areal footprint over a surface of the housing layer, and wherein the housing layer, the first and second visco-elastic damping layers and the first and second rigid damping layers have respective thicknesses selected to attenuate excitation energy transmitted to the planar housing layer by the excitation source.

9. The multi-layer housing structure of claim 8, wherein the thickness of the first rigid damping layer is different than the thickness of the second rigid damping layer.

10. The multi-layer housing structure of claim 8, further encloses and supports an excitation source comprising a spindle motor configured to rotate a data storage disc within the housing structure, wherein the spindle motor is mechanically coupled to the planar housing layer at a contact point, and wherein the multi-layer damping structure circumferentially extends about the contact point.

11. The multi-layer housing structure of claim 8, wherein the planar housing layer comprises a planar recess substantially corresponding to the areal footprint of the multi-layer damping structure, and wherein the multi-layer damping structure is disposed within the planar recess so that the first visco-elastic damping layer contactingly adheres to the planar recess.

12. The multi-layer housing structure of claim 8, wherein the first and second rigid damping layers are each formed of stainless steel.

13. The multi-layer housing structure of claim 8, wherein the first and second visco-elastic damping layers are each formed of pressure sensitive adhesive.

14. The multi-layer housing structure of claim 8, wherein the respective thicknesses of the first and second rigid damping layers are selected in accordance with a method comprising steps of:

determining a resonant frequency of the housing layer;

developing a plurality of hypothetical models for the housing structure each comprising first, second and third theoretical layers wherein at least one of said theoretical layers comprises multiple damping layers;

determining a loss factor profile for each said hypothetical model in relation to the resonant frequency; and selecting the thickness of each of the first and second rigid damping layers in relation to the determined loss factor profiles.

15. A multi-layer housing structure comprising:

a substantially planar housing layer; and a plurality of rigid damping layers interposed with a plurality of visco-elastic damping layers in a laminate stack adjacent the planar housing layer, wherein a final characteristic of each of said rigid damping layers and said visco-elastic damping layers is determined by steps for determining a final characteristic of each of said rigid and visco-elastic damping layers.

16. The multi-layer housing structure of claim 15, wherein the steps for determining a final characteristic of each of said rigid and visco-elastic damping layers comprising:

determining a resonant frequency of the planar housing layer;

developing a plurality of hypothetical models for the housing structure, each model comprising first, second and third theoretical layers wherein at least one of said theoretical layers comprises multiple damping layers;

determining a loss factor profile for each said hypothetical model in relation to the resonant frequency; and selecting the final characteristic of each of said rigid damping layers, and said visco-elastic damping layers in relation to the loss factor profiles from the determining step.

* * * * *